United States Patent
Giessen et al.

(10) Patent No.: US 10,241,353 B2
(45) Date of Patent: Mar. 26, 2019

(54) DEVICE WITH SWITCHABLE, CHIRAL OPTICAL PROPERTIES, MEANS FOR POLARIZATION MODULATION, AND RELATED METHOD

(71) Applicant: Baden-Württemberg Stiftung gGmbH, Stuttgart (DE)

(72) Inventors: Harald Giessen, Marnheim (DE); Xinghui Yin, Stuttgart (DE)

(73) Assignee: BADEN-WURTTEMBERG STIFFUNG GMBH, Stuttgart (DE)

( * ) Notice: Subject to any disclaimer, the term of this patent is extended or adjusted under 35 U.S.C. 154(b) by 121 days.

(21) Appl. No.: 15/169,865

(22) Filed: Jun. 1, 2016

(65) Prior Publication Data
US 2017/0059891 A1 Mar. 2, 2017

(30) Foreign Application Priority Data
Jun. 2, 2015 (EP) .................................... 15170348

(51) Int. Cl.
G02B 1/00 (2006.01)
G02B 5/00 (2006.01)
G02F 1/01 (2006.01)
G02B 27/28 (2006.01)

(52) U.S. Cl.
CPC ........... *G02F 1/0136* (2013.01); *G02B 1/002* (2013.01); *G02B 5/008* (2013.01); *G02B 27/286* (2013.01); *G02B 2207/101* (2013.01); *G02F 2202/30* (2013.01); *G02F 2202/36* (2013.01)

(58) Field of Classification Search
CPC ......... G02F 1/0136; G02B 1/002; G02B 1/08; G02B 27/286

USPC .................................................. 359/301–304
See application file for complete search history.

(56) References Cited

U.S. PATENT DOCUMENTS 7,507,449 B2 * 3/2009 Chari .................... B82Y 20/00
                                                       252/299.01

OTHER PUBLICATIONS

Hentschel, Mario, et al. "Optical Rotation Reversal in the Optical Response of Chiral Plasmonic Nanosystems: The Role of Plasmon Hybridization." ACS Photonics, vol. 2, No. 9, 2015, pp. 1253-1259., doi:10.1021/acsphotonics.5b00354.*
Plum, E., et al. "Metamaterial with Negative Index Due to Chirality." Physical Review B, vol. 79, No. 3, 2009, doi:10.1103/physrevb.79.035407.*
Wang, Bingnan, et al. "Nonplanar Chiral Metamaterials with Negative Index." Applied Physics Letters, vol. 94, No. 15, 2009, p. 151112., doi:10.1063/1.3120565.*
Kan, Tetsuo, et al. "Enantiomeric Switching of Chiral Metamaterial for Terahertz Polarization Modulation Employing Vertically Deformable MEMS Spirals." Nature Communications, vol. 6, No. 1, 2015, doi:10.1038/ncomms9422.*

(Continued)

*Primary Examiner* — Zachary W Wilkes
(74) *Attorney, Agent, or Firm* — Stephen T. Olson; Harness, Dickey & Pierce, P.L.C.

(57) ABSTRACT

A device with switchable, chiral optical characteristics, has a first chiral arrangement with a first arrangement layer with at least one first nanostructure and a second arrangement layer with at least one second nanostructure. The first nanostructure and the second nanostructure are arranged relative to one another such that the chiral arrangement is chiral. A switching material with switchable dielectric characteristics is arranged between the first arrangement layer and the second arrangement layer.

20 Claims, 3 Drawing Sheets

(56) References Cited

OTHER PUBLICATIONS

Kenanakis, G., et al. "Optically Controllable THz Chiral Metamaterials." Optics Express, vol. 22, No. 10, 2014, p. 12149., doi:10.1364/oe.22.012149.*

Zhang, Shuang, et al. "Photoinduced Handedness Switching in Terahertz Chiral Metamolecules." Nature Communications, vol. 3, No. 1, 2012, doi:10.1038/ncomms1908.*

Zhou, Jiangfeng, et al. "Terahertz Chiral Metamaterials with Giant and Dynamically Tunable Optical Activity." Physical Review B, vol. 86, No. 3, 2012, doi:10.1103/physrevb.86.035448.*

Tun Cao et al: "Strongly tunable circular dichroism in gammadion chiral phase-change metamaterials", Optics Express, vol. 16, No. 7, p. 4479-4486 (2008), Bd. 21, Nr. 23, Nov. 18, 2013 (Nov. 18, 2013), p. 27841, XP055212338, ISSN: 2161-2072, DOI: 10.1364/OE.21.027841, the whole document.

Xinghui Yin et al: "Interpreting Chiral Nanophotonic Spectra: The Plasmonic Born-Kuhn Model", Nano Letters, Bd. 13, Nr. 12, Dec. 11, 2013 (Dec. 11, 2013) pp. 6238-6243, XP055212349, ISSN:1530-6984, DOI: 10.1021/nl403795k, the whole document.

Knight, M. W. et al. "Aluminum for Plasmonics." ACS Nano, vol. 8, No. 1, pp. 834-840 (2014).

Vedeshwar, A., "Optical Properties of Amorphous and Polycrystalline Stibnite (Sb2S3) Films." Journal de Physique III, EP Sciences, vol. 5, No. 8, pp. 1161-1172 (1995).

* cited by examiner

DEVICE WITH SWITCHABLE, CHIRAL OPTICAL PROPERTIES, MEANS FOR POLARIZATION MODULATION, AND RELATED METHOD

CROSS-REFERENCE TO RELATED APPLICATIONS

This application claims the benefit of and priority to European Patent Application No. EP 15170348.5, filed Jun. 2, 2015. The disclosures of the above application are incorporated herein by reference.

The invention relates to a device with switchable, chiral optical characteristics, a means for polarization modulation, and a use of a device with switchable, chiral optical characteristics or a means for polarization modulation.

Approaches for the implementation of devices with switchable, chiral optical characteristics have previously existed in the visible spectral range (Kuzyk, A.; Schreiber, R.; Zhang, H.; Govorov, A. O.; Liedl, T.; Liu, N. Nat. Mater. 2014), and in the terahertz spectral range (Zhang, S.; Zhou, J.; Park, Y.-S.; Rho, J.; Singh, R.; Nam, S.; Azad, A. K.; Chen, H.-T.; Yin, X.; Taylor, A. J.; Zhang, X. Nat Commun. 2012, 3, 942). For the visible spectral range, it is thus known that the chirality of a chiral metamaterial produced through self-organization of DNA can be altered through the addition of special locking DNA strands that establish the relative position of metallic nanostructures. In the terahertz range, it is known that a greater charge carrier density in silicon when irradiated with terahertz radiation can be exploited in order to produce conductive connections at different points between metallic parts of the chiral metamaterial. These known approaches do not make it possible, or only to a limited extent, to tune the characteristics of such a device to a desired wavelength range. Moreover, these approaches are each limited to the visible or terahertz spectral range. For example, it is not possible to use DNA self-organization to switch chiral optical characteristics in the middle infrared range, since the colloidal nanoparticles used cannot be synthesized large enough in order to obtain plasmonic resonances in the middle infrared range. Nor is the switching concept known from the terahertz range available in the middle infrared range, since the photon energies are smaller here than the bandgap of silicon, so no conductive connections can be produced through irradiation. An additional drawback of the DNA-based method in particular is that it is very slow, requiring approximately a half-hour in order to switch from one chirality of the chiral response to the other.

It is the object of the invention to provide a device with switchable, chiral optical characteristics, a means for polarization modulation and a use of such a device or of such a means in which the cited drawbacks do not occur.

The object is achieved by the subject matter of the independent claims. Advantageous embodiments follow from the subclaims.

The object is particularly achieved through the provision of a device with switchable, chiral optical characteristics that has a first chiral arrangement, wherein the first chiral arrangement has a first arrangement layer with at least one first nanostructure and a second arrangement layer with at least one second nanostructure, wherein the first nanostructure and the second nanostructure are arranged relative to one another such that the arrangement is chiral, and wherein a switching material with switchable dielectric characteristics is arranged between the first arrangement layer and the second arrangement layer. The device has advantages over the prior art. In particular, the device preferably has a simple layered structure that is also simple and cost-effective to manufacture comprising the first arrangement layer, a layer of the switching material, and the second arrangement layer, the device having a planar design that can be very thin. In addition or alternatively, the device enables modulation of the chiral response over a wide range of wavelengths, it being possible in particular to achieve the modulation through specific selection of the nanostructures used and/or of the switching material used. In particular, the material, size and/or geometry of the nanostructures can be varied in order to adapt the wavelength of a chiral optical response of the device. There are no fundamental restrictions in terms of a certain wavelength range. In particular, it is even possible to use the device being proposed here in the middle infrared range and to adapt it to that spectral range. The switching material can be switched very rapidly, particularly on ultrafast timescales. Depending on the switching principle used, it is possible to switch the switching material in a few femtoseconds or in a few picoseconds with respect to its dielectric characteristics and hence the device as a whole with respect to its chiral optical characteristics. Moreover, the device is mechanically very robust, since it does not require freestanding or moving parts of any kind. Rather, the entire device can be embodied as a robust and compact multilayered layer system.

The fact that the device is switchable means, in particular, that it can be switched between a first switching state and a second switching state—and preferably back again, i.e., preferably in a reversible manner.

The term "chiral optical characteristics" is particularly understood as meaning that the device, upon being irradiated with light of different polarization, particularly linear or circular, particularly right- or left-circular polarization, has different optical responses. An optical response is understood particularly as an influencing of the irradiated electromagnetic radiation in terms of optical activity, that is, a different refraction of the incident radiation with a different direction of polarization and/or a different absorption of radiation of different polarization, particularly a circular dichroism.

The fact that the optical characteristics are switchable means particularly that a wavelength, particularly a maximum of an optical band, that is, a peak wavelength, in the vicinity of which a chiral optical response occurs, can be changed with respect to its spectral position, this wavelength having a first value in a first switching state and a second value different from the first value in a second switching state. A switchable chiral characteristic is also understood as a switchable optical activity and/or a switchable circular dichroism, wherein particularly the chirality of the optical response, that is, the effect on electromagnetic radiation of different polarization, can be changed, particularly permuted or inverted. In particular, it is possible for the device to transmit electromagnetic radiation of a first circular polarization in a first switching state and absorb light of a second circular polarization, with the device transmitting electromagnetic radiation of the second circular position in a second switching state while absorbing electromagnetic radiation of the first circular polarization.

A nanostructure refers to a geometric arrangement of a certain material having a certain geometry having a dimension on the nanometer scale, particularly several nanometers to several 100 nm, in at least one direction. Preferably, the nanostructure has a dimension on the nanometer scale in every direction. Preferably, the device has nanostructures that have a plasmonic material, particularly a metal, or consist of a plasmonic material, particularly a metal. In particular, it is possible for the nanostructures to have gold or consist of gold. Aluminum and/or titanium nitride as well as dielectric, highly refractive materials having Mie resonances merit consideration as materials for the nanostructures.

At least one first nanostructure of the first arrangement layer and at least one nanostructure of the second arrangement layer are preferably arranged in a near-field array in relation to one another. Particularly, a second nanostructure is preferably associated with each first nanostructure, with mutually associated first and second nanostructures forming together a so-called plasmonic dimer. By means of the near-field array or the arrangement as a plasmonic dimer, the two, mutually associated nanostructures are electronically coupled with one another, whereby they form together a plasmonic arrangement with a plasmonic resonant frequency. Due to the chiral arrangement of the nanostructures, the optical response of the arrangement of the two nanostructures is also chiral, so the arrangement particularly has an optical activity and/or a circular dichroism. Especially preferably, the mutually associated first and second nanostructures overlap at least in areas along a certain direction, although they do not touch but are spaced apart from one another when seen along the same direction.

The term "near field" refers here particularly to an environment around a nanostructure in which no separation or emission of a radiation field has (yet) occurred. In particular, characteristics of an electromagnetic wave in the near field are described with the distance r of polynomials $r^{-n}$ where $n>1$, particularly with high order n. By contrast, in the far field at a large distance from the nanostructure being observed, the description is reduced to the first order $n=1$, that is, to a dependency of $1/r$, which dominates all other terms.

The second arrangement layer is preferably aligned parallel to the first arrangement layer. In particular, the first arrangement layer and the second arrangement layer are embodied as layers that are oriented parallel to one another. The switching material is preferably also arranged in layered fashion and—parallel to the first and second arrangement layer—arranged therebetween. However, an exemplary embodiment is also possible in which the switching material is not layered but provided in a locally limited manner between mutually associated first and second nanostructures, particularly in an area of overlap between mutually associated first and second nanostructures in which they overlap. It has been found that such an arrangement of the switching material locally between the nanostructures associated with one another in pairs and particularly in the area of overlap thereof is sufficient in order to represent the switchable, chiral optical characteristics for the device.

In a preferred exemplary embodiment, different switching material regions associated with different pairs of first and second nanostructures can be switched, particularly controlled, independently of one another. In this way, it is possible to switch the chiral optical characteristics of the device locally, particularly separately and independently. It is thus particularly possible to implement an optically switchable device that is chiral on a pixel-by-pixel basis.

The terms "chiral" and "chirality" are understood as the characteristic that an object cannot be converted into its mirror image by rotating in space. This characteristic is also referred to as "handedness," because a hand is a familiar example of such a chiral object. It is not possible to convert a left hand into a right hand by rotating it in space. The right hand therefore represents the mirror image of the left hand.

It is possible for the first arrangement layer per se to be chiral. Alternatively or in addition, it is possible for the second arrangement layer per se to be chiral. It is important that the at least one first nanostructure of the first arrangement layer be arranged relative to the second nanostructure of the at least one second arrangement layer such that the arrangement is embodied as a whole so as to be chiral in all cases. It is readily possible to arrange two nanostructures in space in relation to one another such that this arrangement cannot be converted into its mirror image through rotation in space. The arrangement is then chiral as a whole.

It is possible for the first nanostructure and the second nanostructure to be identical, particularly to have an identical geometry and/or an identical material. Alternatively, it is also possible for the first and the second nanostructure to differ in terms of at least one characteristic. Even if the first and the second nanostructure are identical, it is readily possible to arrange them in space relative to one another such that an arrangement is formed that is chiral as a whole.

Especially preferably, the first and the second nanostructure are arranged relative to one another such that a so-called plasmonic Born-Kuhn-type dimer is created. Such plasmonically active, chiral dimers are described, for example, in the following publications: Yin, X.; Schäferling, M.; Metzger, B.; Giessen, H. *Nano Lett.* 2013, 13, 6238-6243; Auguié, B.; Lorenzo Alonso-Gomez, J.; Guerrero-Martinez, A.; Liz-Marzán, L. M. *J Phys Chem Lett* 2011, 2, 846-851; Svirko, Y; Zheludev, N.; Osipov, M. *Applied Physics Letters* 2001, 78, 498-498. In the present device, however, the plasmonic chiral dimer is modified such that the switching material is arranged between the two monomers of the dimer, the two monomers of the dimer being spaced apart from one another by the switching material. This has the two-fold advantage, on the one hand, of ensuring an optimal interaction between the nanostructures because the switching material can be arranged in the vicinity of the near-field coupling of the nanostructures and, on the other hand, of ensuring simple manufacture, given that no additional lithography step is necessary.

The term "switchable dielectric characteristics" is particularly understood as meaning that the switching material can be switched with respect to its dielectric constant.

One exemplary embodiment of the device in particular is preferred that is characterized in that the switching material can be switched—preferably reversibly—between a first switching state in which a dielectric constant of the switching material has a first value and a second switching state in which the dielectric constant of the switching material has a second value that is different from the first value. The chiral optical characteristics of the device being proposed here are based substantially on plasmonic resonances of the nanostructures used. A plasmonic resonance is understood here as being a collective vibration of surface electrons, it being possible to modulate a plasmonic resonance of a nanostructure over a wide range of wavelengths particularly through the specific selection of the material and of the specific geometry of the nanostructure. In addition, however, a plasmonic resonance is very sensitive to the dielectric environmental conditions in the near field of the nanostructure. By switching the dielectric constant of the switching material it is thus possible to change the plasmonic resonance of the nanostructures of the chiral arrangement and thus shift a peak wavelength of the chiral optical characteristics of the device with respect to its spectral position. This can be done very quickly and preferably reversibly.

A transition between the first switching state and the second switching state of the switching material can preferably be induced thermally, optically and/or electrically. The switching material can preferably be switched optically in a few femtoseconds and electrically in a few picoseconds.

Preferably, the switching material can be switched into a plurality of switching states, with the previously described first switching state and the previously described second switching state representing extreme states, it being possible for at least one other switching state, preferably a plurality of other switching state to be implemented between the first and the second switching state. In these intermediate states, the dielectric constant of the switching material preferably takes on values that lie between the values of the first switching state and second switching state. Especially preferably, the switching material can be switched in a continuum of switching state between the first and the second switching state. For example, a plurality of switching states can be implemented in one switching material having an amorphous phase in a first switching state and a crystalline phase in a second switching state. The crystallization takes place in the switching material as a nucleation process, so that particularly homogeneously distributed, small crystallites form seeds for subsequent crystal growth, and crystals growing from locally homogeneous centers finally transition into an overall homogeneous crystal structure. A multitude of intermediate crystallization steps with progressive crystallization exist, with every such crystallization step being inherently stable and the switching material having a mean dielectric constant that can be determined, for example, according to the Maxwell-Garnett theory. The dielectric environmental conditions for the nanostructures can thus be adjusted quasi-continuously or continuously between the first switching state and the second switching state, it also being possible to shift the peak wavelength of the chiral optical characteristics of the device in its spectral position, particularly quasi-continuously or continuously.

One exemplary embodiment of the device is preferred which is characterized in that a protective layer is arranged between the first arrangement layer and the switching material. Alternatively or in addition, a protective layer is preferably arranged between the switching material and the second arrangement layer. Such a protective layer protects the switching material from degradation or decomposition, particularly from oxidation and/or from diffusion of the material of the nanostructures—gold, for example—into the switching material during the switching process. Usually, such protective layers are avoided in order to ensure direct contact between the dielectric material and the plasmonic nanostructures, thus maximizing the interaction of the near fields of the nanostructures in the area of the dielectric material. However, it was recognized in relation to the invention that protective layers, as it were, can be used in the device being proposed here without substantially impeding the near-field interaction between the nanostructures. The reason for this is that the selected dimer configuration results in a high level of field amplification between the nanostructures, so that the near field is stronger here than at an end of an individual nanostructure. It is therefore possible to exploit the advantage of protective layers for protecting the switching material without impairing the efficiency of the arrangement of the first and second nanostructures relative to one another.

The at least one protective layer preferably has an inorganic material or consists of an inorganic material. Particularly, an arrangement of zinc sulfide and silicon dioxide ($ZnS/SiO_2$) is preferred as a protective layer.

An exemplary embodiment of the device is preferred which is characterized in that the first and the second arrangement layer have a plurality of nanostructures. Preferably, the first arrangement layer has a plurality of first nanostructures, while the second arrangement layer has a plurality of second nanostructures at the same time. A first nanostructure of the first arrangement layer is preferably associated respectively with a second nanostructure of the second arrangement layer, so that the first and second nanostructures implement, in pairs, a plasmonic dimer arrangement—particularly of the Born-Kuhn type. As a whole, the chiral arrangement thus has a plurality of plasmonic dimer arrangements. In particular, the chiral arrangement is embodied as a so-called metamaterial. A metamaterial is understood as an artificially prepared structure having substructures of electrically or magnetically active materials—here specifically the plurality of dimer arrangements of the first and second nanostructures. The individual substructures can be arranged in the form of cells or supercells, or also as individual elements. Typically, such a metamaterial has a permeance for electrical and magnetic fields, particularly a permittivity and permeability, that differs from the usual values in nature. Metamaterials with customized optical characteristics can be created. By structuring the arrangement as a metamaterial, a very high level of efficiency can be achieved in a device with pronounced chiral optical characteristics. The nanostructures are arranged within the first and/or within the second arrangement layer, preferably periodically. It is also possible for the nanostructures to be arranged aperiodically within the first arrangement layer and/or within the second arrangement layer. A periodic arrangement has the advantage of especially easy manufacturability. An aperiodic arrangement has the advantage that so-called Rayleigh anomalies can be suppressed. A slight deviation from a periodic arrangement is sufficient for this purpose, so a completely chaotic arrangement of the nanostructures is not required by any means.

An exemplary embodiment of the device is also preferred which is characterized in that at least one nanostructure of the first and/or of the second arrangement layer is embedded in a covering layer. Preferably, all of the nanostructures of the first and/or second arrangement layer are embedded in a covering layer. The covering layer has the advantage of protecting the nanostructures and preferably acts simultaneously as a planarization layer that makes available a flat bearing surface for a subsequent layer, particularly the switching material, or a layer arranged over the second arrangement layer or under the first arrangement layer. A polymer, especially preferably a spin-on polymer, particularly PC403, is preferably selected as the covering layer.

An exemplary embodiment of the device is preferred which is characterized in that the switching material is embodied as a phase change material. The first switching state of the material is associated with a first phase, and the second switching state is associated with a second phase. Such a phase change material has proven to be highly suitable for bringing about a quick and preferably reversible switchability between a first and a second phase and thus a first and a second switching state. It is possible in this regard for the phase change material to preferably be present in amorphous form in the first phase and in crystalline form in the second phase. Values of the dielectric constant of the switching material preferably differ clearly between the first and the second phase. Especially preferably, a phase change material is used which has a chalcogenide compound or consists of a chalcogenide compound. Such chalcogenide compounds can be reproducibly switched from a first, amorphous phase to a second, crystalline phase—and reversibly back, with the values of the dielectric constant in the two phases differing clearly from one another. Especially preferably, the phase change material GST-326, which has a germanium-antimony-tellurium compound or consists of such a compound, particularly with the empirical formula $Ge_3Sb_2Te_6$, is used as a switching material. This material is used for optical data storage on DVDs, for example, and has outstanding electro-optical characteristics that make it a suitable choice as a material for low-energy, high-contrast optical display devices. This material can be switched from a first, amorphous phase to a second, crystalline phase, the dielectric constant or relative permittivity in the first, amorphous phase having a value of 3.5+0.01i and, in the crystalline phase, a value of 6.5+0.06i in the middle infrared range (4 to 5 µm). This sizable difference in the values of the dielectric constant in the two phases leads to a substantial spectral shifting of the peak wavelength of the optical response of the switchable device. At the same time, it is possible to switch the material GST-326 thermally, optically or electrically, with very fast switching times being achievable with optical and electric switching, particularly of a few femtoseconds in the case of optical switching and of a few picoseconds in the case of electric switching.

An exemplary embodiment of the device is preferred which is characterized in that the at least one first nanostructure is embodied as a nanorod. Alternatively or in addition, the at least one second nanostructure is embodied as a nanorod. The form of nanorods has proven especially suitable, particularly for the manufacture of plasmonic dimers with chiral optical characteristics. Preferably, a first nanorod of the first arrangement layer—when viewed on an imaginary plane of the arrangement—oriented perpendicular to a second nanorod of the second arrangement layer, the first nanorod and the second nanorod being arranged so as to be vertically offset with respect to one another, with both having overlapping ends when viewed from above. An imaginary plane of the arrangement is understood here particularly as a plane along which the arrangement layers on the one hand and the switching material on the other hand extend. A vertical direction stands perpendicular on the imaginary plane and particularly forms a stacking direction of the layers. When seen from above, the observer looks along the vertical direction of the imaginary plane. The first and the second nanorods are therefore particularly arranged at an angle to each other, but so as to be vertically offset with respect to one another, particularly spaced apart from one another by the switching material, and overlap with a respective end. In particular, a first end of one nanorod thus overlaps with a second end of the second nanorod. The nanorods are coupled with one another in the near field in the vicinity of the overlapping ends. Such an arrangement of nanorod has proven to be especially suitable for providing an arrangement with chiral optical characteristics. It is also observed that such an arrangement of two nanorods is chiral, because it cannot be converted into its mirror image through rotation in space. Since the nanorods are arranged in the near field with respect to one another, with the switching material being arranged in the near field between the two nanorods, a plasmonic resonance of the dimer arrangement of the two nanorods can be changed by switching the dielectric characteristics of the switching material.

As already pointed out previously, the nanostructures are adapted to a predetermined wavelength range for the chiral optical response of the device, particularly with regard to its geometry. In addition or alternatively, the switching material is preferably adapted in its characteristics to the predetermined wavelength range. In particular, both the nanostructures and the switching material are preferably adapted to the predetermined wavelength range and particularly to one another. The geometry of the nanostructures is thus preferably selected such that their plasmonic resonance lies in a transparency window of the switching material, so that an electromagnetic radiation that is particularly not absorbed by the dimer arrangement of the nanostructures is not absorbed by the switching material, for instance, but rather is also transmitted.

In a preferred exemplary embodiment, a nanorod has a length of 660 nm measured on the imaginary plane, a width of 40 nm also measured on the imaginary plane, and a thickness of 50 nm measured perpendicular to the imaginary plane. With such a geometry, the nanorods are particularly adapted to the middle infrared range for the chiral optical response of the device. The transparency window of the switching material preferably also lies in the middle infrared range. For example, the transparency window of GST-326 lies in the range from 2.8 µm to 5.5 µm, both for the amorphous and crystalline phases. In this way, it is possible to ensure—particularly also through the appropriate selection of the layer thickness of the switching material—that absorption losses in the switching material are a great deal smaller than 1% and thus negligible.

An exemplary embodiment of the device is preferred which is characterized in that the arrangement has a supercell having eight nanostructures. The supercell extends over the first arrangement layer and the second arrangement layer and has four nanostructures in each arrangement layer that are arranged along the edges of a rectangle, particularly of a square. The four nanostructures of the first arrangement layer are arranged in mirror symmetry to the four nanostructures of the second arrangement layer, the plane of mirror symmetry extending perpendicular to the arrangement layers, particularly perpendicular to the imaginary plane. Moreover, the rectangles, particularly squares, of the supercell are arranged so as to be mutually superimposable in the two arrangement layers, particularly with all of the mutually corresponding corners overlapping in pairs. The supercell thus comprises four dimer arrangements, each of a first nanostructure of the first arrangement layer and of a second nanostructure of the second arrangement layer, the dimer arrangements being arranged within the supercell such that their monomers overlap respectively at the corners of the rectangle, particularly square. The specific geometric embodiment described here has proven to be especially favorable for the chiral optical characteristics of the device.

The supercell preferably has a $C_4$ symmetry.

Preferably, the arrangement comprises a plurality of identical supercells that are arranged so as to be offset from one another, it being possible for the supercells to be arranged periodically or aperiodically. An aperiodic arrangement offers the particular advantage that Rayleigh anomalies can be efficiently suppressed. A periodic arrangement of supercells, on the other hand, has the advantage of being especially simple to manufacture.

An exemplary embodiment of the device is also preferred which is characterized in that a second chiral arrangement is arranged on the first chiral arrangement, the second chiral arrangement being free of switching material. Especially preferably, the second chiral arrangement is arranged directly and immediately on the second arrangement layer of the first chiral arrangement. The first chiral arrangement is embodied by the switching material as an active chiral arrangement and can be switched with respect to its optical characteristics, particularly with respect to a peak wavelength of its optical response. In contract, the second chiral arrangement, which is free of switching material, that is, has no switching material, is embodied as a passive chiral arrangement with unchangeable chiral optical characteristics. The second chiral arrangement is preferably embodied as a bias arrangement that is set up to shift the optical response of the developed relative to the optical response of the first chiral arrangement—particularly in relation to an amplitude of the chiral optical response. Preferably, the first chiral arrangement and the second chiral arrangement are spaced so far apart from one another—particularly through the appropriate selection of a layer thickness of at least one covering layer of one of the chiral arrangements—that near-field coupling between the chiral arrangements is prevented. In particular, it is possible for the first chiral arrangement and the second chiral arrangement to be offset from one another by more than 200 nm when seen in the vertical direction. In this way, it is ensured that the presence of the respective other chiral arrangement does not disturb an observed chiral arrangement and does not change its optical characteristics. Rather, the arrangement of the second chiral arrangement on the first chiral arrangement changes only the chiral optical response of the overall device, which can then be represented as the sum of the two chiral optical responses.

The second chiral arrangement, in turn, preferably has a first chiral arrangement layer with at least one first nanostructure, particularly a plurality of first nanostructures, as well as a second arrangement layer with at least one second nanostructure, preferably a plurality of second nanostructures. The first and the second nanostructure are arranged relative to one another such that the second chiral arrangement is chiral. With the exception of the switching material, which does not have the second chiral arrangement, the first and the second chiral arrangement are preferably structurally similar or identical, it being possible for them to differ in terms of the specific geometry of the selected nanostructures in order to ensure optimal wavelength modulation between the chiral arrangements. Particularly the geometry, especially a length, of the nanostructures of the second chiral arrangement are adapted such that their chiral optical response lies in the same spectral range, preferably at the same peak wavelength, as the optical response of the first chiral arrangement. A change in geometry can be necessary here because the dielectric environment of the nanostructures in the second chiral arrangement is different than in the first chiral arrangement due to the missing layer of the switching material. Apart from that, however, everything that was explained in relation to the first chiral arrangement preferably also applies to the second chiral arrangement.

An exemplary embodiment of the device is preferred which is characterized in that the second chiral arrangement is embodied such that it has chiral optical characteristics, particularly a circular dichroism signal, at the same wavelength, particularly peak wavelength, as the first chiral arrangement, preferably in one of the switching states, particularly in the first switching state. Moreover, the second chiral arrangement preferably has reversed chirality in comparison to the first chiral arrangement. This can be achieved particularly by disposing the plasmonic dimers of the second chiral arrangement in mirror symmetry to the plasmonic dimers of the first chiral arrangement. Alternatively or in addition, supercells of the second chiral arrangement are preferably disposed in mirror symmetry to the supercells of the first chiral arrangement. Furthermore, in comparison to the first chiral arrangement, the second chiral arrangement preferably has a circular dichroism signal—preferably at the same peak wavelength—with inverted sign and half amplitude. In this way, it is possible to provide a device with switchable chirality of the chiral optical response, particularly of the circular dichroism signal.

The functionality of the device is then particularly as follows: The second chiral arrangement has a circular dichroism signal with inverted sign and half amplitude at the same peak wavelength as the first chiral arrangement in a first switching state of the switching material, for example. If the switching material is in the first switching state, this has the consequence that the device as a whole has a circular dichroism signal that is half as large in sum as the circular dichroism signal of the first chiral arrangement alone. The circular dichroism signal of the device as a whole is namely the sum of the two individual circular dichroism signals of the two chiral arrangements. Therefore, if the first chiral arrangement has a circular dichroism signal of 100% at the peak wavelength, for example, and the second chiral arrangement has a circular dichroism signal of −50% at the peak wavelength, then the device as a whole has a circular dichroism signal of 50% in the first switching state. If the switching material is then switched to the second switching state, the plasmonic resonance of the first chiral arrangement, and hence its peak wavelength, shifts sufficiently far from its original spectral position that the first chiral arrangement has quasi no or only a negligible circular dichroism signal at the spectral position of the original peak wavelength, which is still the spectral position of the peak wavelength of the second chiral arrangement. In the second switching state, the device as a whole then has the circular dichroism signal of the second chiral arrangement, namely −50%. By switching the switching material from the first switching state to the second switching state and back, it is thus possible to switch the circular dichroism signal of the device from +50% to −50%, for example, while the amplitude with respect to its sign remains the same. A device is thus being provided in which, in particular, the chirality of a chiral optical response can be inverted in a quick and easy manner.

The second chiral arrangement is preferably tuned to the peak wavelength of the first chiral arrangement by varying a length of the nanostructures, particularly of nanorods, of the second chiral arrangement. A tuning of the amplitude of the circular dichroism signal of the second chiral arrangement to the amplitude of the circular dichroism signal of the first chiral arrangement is preferably achieved by varying the vertical distance of the first nanostructure of the second chiral arrangement to the second nanostructure of the second chiral arrangement.

A circular dichroism signal is understood as a—particularly wavelength-dependent—quantity that can be represented as the difference of a quantity representing a transmission of right-handedly, circularly polarized electromagnetic radiation minus a quantity representing a transmission of left-andedly, circularly polarized electromagnetic radiation. The transmission values themselves can be incorporated into a formula for calculating the circular dichroism signal, although it is also possible to use a quantity derived from this, such as logarithms of the transmission variables. For example, a circular dichroism signal CD can be defined in the following manner:

$$CD(\lambda)=33(\log T_R(\lambda)-\log T_L(\lambda)), \quad (1)$$

the circular dichroism signal CD being calculable in a simple and inherently known manner from transmission spectra for right-handedly, circularly polarized radiation $T_R$ on the one hand and left-handedly, circularly polarized radiation $T_L$ on the other hand.

An exemplary embodiment of the device is also preferred which is characterized in that the first chiral arrangement is built on a substrate that is transparent at least in a predetermined wavelength range. In this way, the first chiral arrangement—and preferably the second chiral arrangement at the same time—can be arranged in a stable and permanent manner on the substrate, preferably without impairing the optical characteristics of the device. In particular, the wavelength range in which the substrate is transparent is preferably adapted to the wavelength range of the chiral optical characteristics of the first chiral arrangement and preferably of the second chiral arrangement, particularly to the peak wavelength of a chiral response of the device. Particularly if the device is tuned to the middle infrared range, calcium fluoride, $CaF_2$, is preferred as a substrate.

An exemplary embodiment of the device is also preferred which is characterized in that the first chiral arrangement has a circular dichroism signal at a wavelength in the infrared range, in the gigahertz range, in the terahertz range, in the visible range, and/or in the ultraviolet range. The nanostructures can particularly be readily tuned to a desired wavelength range through the selection of its material and/or its geometry. In addition or alternatively, the switching material is preferably tuned to the desired wavelength range. In particular, the nanostructures and the switching material are tuned to one another and to the desired wavelength range. The device can be modulated very flexibly over a wide frequency range and have switchable, chiral optical characteristics in a desired frequency range.

An exemplary embodiment of the device is especially preferred which has a circular dichroism signal at a peak wavelength in the middle infrared range, preferably in a range from at least 4 μm to no more than 5 μm, especially preferably in a range from at least 4.15 μm to 4.9 μm. Especially preferably, the peak wavelength of the first chiral arrangement can be switched from a position at 4.15 μm to a position at 4.9 μm. The device thus particularly fills a spectral gap that existed previously when providing devices with switchable, chiral optical characteristics. This is readily possible because the device can be modulated over a wide range of wavelengths.

The object is finally also achieved in that a means for polarization modulation is provided which has a device according to one of the previously described exemplary embodiments. The advantages that were already described in connection with the device are also achieved in connection with the means. The means is preferably set up for polarization modulation in the high frequency range. In particular, the means is preferably set up for polarization modulation in the middle infrared range. Such a means is advantageous particularly in areas of application involving thermal imaging, in polarization-sensitive detection, in nanophotonic circuits, in data storage, and in stereo imaging, very especially 3D image display.

Accordingly, a device for thermal imaging having a corresponding means also belongs to the invention. Moreover, a device for polarization-sensitive detection having a corresponding means belongs to the invention. Moreover, a device for stereo imaging, particularly for three-dimensional image display, having a corresponding means belongs to the invention. Moreover, a nanophotonic circuit with such a means and a data storage device with such a means also belong to the invention.

The means can also be used to implement optical, nanophotonic circuits, or for data storage. Accordingly, devices provided for this purpose that have corresponding means are also preferred.

Finally, the object is also achieved through the provision of the use of a device according to one of the previously described exemplary embodiments or the use of a means according to one of the previously described exemplary embodiments for thermal imaging, polarization-sensitive detection, stereo imaging, particularly for 3D image display, in a nanophotonic circuit and/or for data storage.

The advantages that were already described in connection with the device and the means are also achieved in connection with the use.

In a specific exemplary embodiment of the device, it is possible for the first arrangement layer to be built up on a calcium fluoride substrate ($CaF_2$), the first arrangement layer having nanorods with a length of 660 nm measured on an imaginary plane of the arrangement layer, a width of 40 measured on the imaginary plane, and a thickness of 50 nm measured perpendicular to the imaginary plane. A plurality of such nanorods are arranged on the substrate. A 60 nm-thick planarization layer of a spin-on polymer PC403 is applied to that, so that the nanorods of the first arrangement layer are embedded in the polymer. A 10 nm-thick protective layer of $ZnS/SiO_2$ is applied onto that, onto which, in turn, a 50 nm-thick layer of switching material, particularly GST-326, is applied, onto which, in turn, a 10 nm-thick protective layer of $ZnS/SiO_2$ is applied. The second nanostructures of the second arrangement layer, which are preferably embodied as identical nanorods to the nanostructures of the first arrangement layer, are applied onto this protective layer, these second nanorods being aligned relative to the first nanorods such that, as a whole, $C_4$ symmetrical supercells of chiral dimers are produced, as was already explained previously. As a whole, these supercells are preferably arranged aperiodically over an area of 100 μm by 100 μm in order to prevent Rayleigh anomalies. The second nanostructures of the second arrangement layer are finally covered with a 100 nm-thick covering layer of PC403 in order to symmetrize the dielectric environment of the chiral dimers. The nanostructures preferably consist of a plasmonic material, for example of gold. Aluminum, titanium nitride or dielectric materials that have a high refractive index and can have Mie resonances merit consideration as materials for the nanostructures.

In general, the device preferably has the following structure: The first arrangement layer with a plurality of first nanostructures—embedded in a covering layer—is applied onto a substrate. A protective layer is then applied onto which, in turn, a layer of switching material is applied. In turn, a protective layer is applied onto this, onto which the second nanostructures of the second arrangement layer—embedded in a covering layer—are then applied.

The device is preferably manufactured by first arranging markings on the substrate by means of electron beam lithography, as well as the first nanostructures. The covering layer is applied as a spin-on polymer. The protective layers are preferably applied by means of DC magnetron sputtering. The switching material is preferably also applied by means of DC magnetron sputtering. In a next electron beam lithography step, which is oriented around the markings applied previously to the first arrangement layer, the second nanostructures of the second arrangement layer—aligned relative to the first nanostructures—are applied. These are then finally provided with a covering layer or embedded in a covering layer by means of a spin-on method.

An analogous procedure is used to apply the second chiral arrangement onto the first chiral arrangement, the second chiral arrangement preferably being adapted beforehand such that it has an inverted chirality relative to the first chiral arrangement and, accordingly, a circular dichroism signal that is inverted with respect to its symbol and has half of the amplitude at the same peak wavelength as the first chiral arrangement in a switching state. The second chiral arrangement is spaced apart sufficiently from the first chiral arrangement in order to prevent near-field coupling, the distance between the first chiral arrangement of the second chiral arrangement preferably being at least 200 nm. The nanostructures of the second chiral arrangement are selected such that the circular dichroism signal of the second chiral arrangement lies at the same peak wavelength as the circular dichroism signal of the first chiral arrangement in one of the two switching states of the switching material, preferably as in the first switching state. This is the case, for example, if the nanorods of the second chiral arrangement has a length of 800 nm measured on the imaginary plane, a width of 40 nm measured on this imaginary plane, and a thickness of 40 nm measured perpendicular to the imaginary plane. The first nanorods of the first arrangement layer of the second chiral arrangement are spaced apart from the second nanorods of the second arrangement layer of the second chiral arrangement, preferably by 60 nm in the vertical direction. In addition, with the exception of the protective layers and the switching material, the same materials and the same basic geometric structure are preferably selected for the second chiral arrangement as for the first chiral arrangement. For the second chiral arrangement, it is possible, however, to select a periodic arrangement of C4—symmetrical supercells—particularly with a periodicity of 1800 nm—because the low refractive index of PC403 already prevents the formation of Rayleigh anomalies in the middle infrared range for the selected periodicity.

The invention is explained below in further detail with reference to the drawing.

Figure 1:
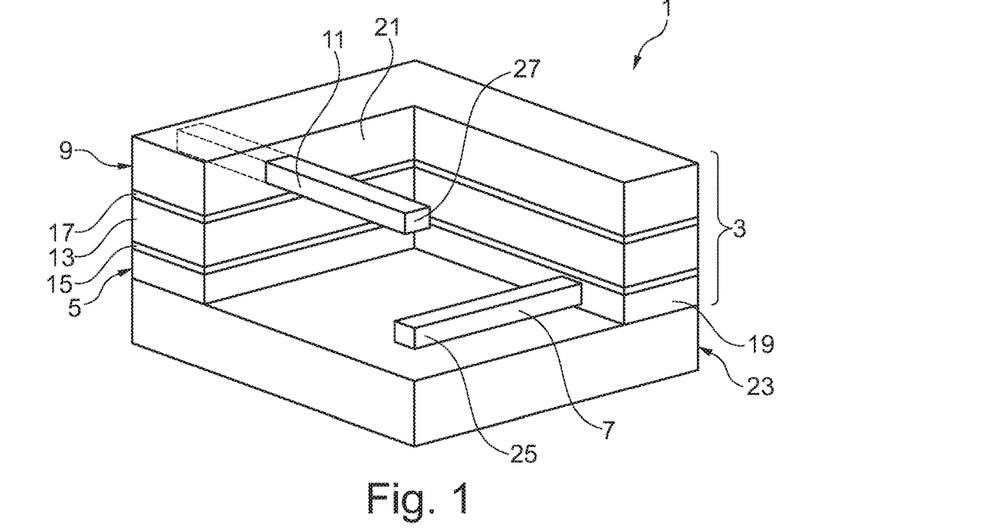
FIG. 1 shows a schematic, partially cutaway illustration of a first exemplary embodiment of a device with switchable, chiral optical characteristics.

FIG. 1 shows a partially cutaway, detailed illustration of a first exemplary embodiment of a device 1 with switchable, chiral optical characteristics. The device 1 has a first chiral arrangement 3, which has a first arrangement layer 5 with a first nanostructure 7 and a second arrangement layer 9 that is aligned parallel to the first arrangement layer 5 and has a second nanostructure 11. The first nanostructure 7 and the second nanostructure 11 are arranged relative to one another such that the chiral arrangement 3 is chiral. The chiral arrangement 3 thus obtains its chiral characteristic particularly from the relative arrangement of the first nanostructure 7 to the second nanostructure 11.

A switching material 13 with switchable dielectric characteristics is arranged between the first arrangement layer 5 and the second arrangement layer 9. In particular, the switching material can be switched—preferably reversibly—between a first switching state in which a dielectric constant of the switching material 13 has a first value and a second switching state in which the dielectric constant has a second value that is different from the first value. A transition between the first switching state and the second switching state can preferably be induced thermally, optically and/or electrically, especially preferably both thermally as well as optically and electrically.

At least one first nanostructure 7 of the first arrangement layer 5 and at least one nanostructure 11 of the second arrangement layer 9 are preferably arranged in a near-field array in relation to one another. Particularly, a second nanostructure 11 is preferably associated with each first nanostructure 7, with mutually associated first and second nanostructures 7, 11 forming together a so-called plasmonic dimer.

Especially preferably, the mutually associated first and second nanostructures 7, 11 overlap at least in areas along a certain direction, although they do not touch but are spaced apart from one another when seen along the same direction.

A first protective layer 15 is arranged between the first arrangement layer 5 and the switching material 13. A second protective layer 17 is arranged between the switching material 13 and the second arrangement layer 9. The protective layers 15, 17 particularly prevent a degradation or decomposition of the switching material 13, particularly as a result of environmental influences such as oxidation, but preferably also as a result of diffusion of material of the nanostructures 7, 11 into the switching material 13.

The first nanostructure 7 and the second nanostructure 11 are each embedded here in a covering layer 19, 21. The covering layers 19, 21 have the function here of protecting the nanostructures 7, 11 on the one hand and planarization on the other hand, particularly in order to enable a defined, plane-parallel layered structure of the arrangement layers 5, 9 of the protective layers 15, 17 and of the preferably stratified layer of the switching material 13.

However, an exemplary embodiment is also possible in which the switching material 13 is not layered but provided in a locally limited manner between mutually associated first and second nanostructures 7, 11, particularly in an area of overlap between mutually associated first and second nanostructures 7, 11 in which they overlap.

The first chiral arrangement 3 is built up on a substrate 23 which is transparent at least in a peak wavelength range in which the device 1 has chiral optical characteristics.

Preferably, the nanostructures 7, 11 have a plasmonic material, preferably gold, or consist preferably of a plasmonic material, preferably of gold. Aluminum, titanium nitride or dielectric materials that have a high refractive index and can have Mie resonances merit consideration as materials for the nanostructures. In particular, the nanostructures 7, 11 are preferably embodied as nanorod or nanowires, it being clear from FIG. 1 that the first nanostructure 7 embodied as a first nanorod—when seen on an imaginary plane of the chiral arrangement 3—is oriented perpendicular to the second nanostructure 11 embodied as a second nanorod, with the nanorods, and hence the nanostructures 7, 11 being offset from one another in the vertical direction and—when seen from the top—having overlapping ends 25, 27. To illustrate this more clearly, the covering layers 19, 21, the protective layers 15, 17 and the switching material 13 are partially cut away here, thus exposing the nanostructures 7, 11. In reality, the nanostructures 7, 11 are preferably embedded completely in the covering layers 19, 21, and the cut-out shown in FIG. 1 is not present. The protective layers 15, 17 and the switching material 13 also preferably extend over the entire surface of the device 1, and particularly of the substrate 23.

The two nanostructures 7, 11 particularly form a plasmonic dimer of the Born-Kuhn type.

The substrate 23 preferably has calcium fluoride (CaF$_2$) or consists of calcium fluoride. The spin-on polymer PC403 is preferably selected for the covering layers 19, 21.

The protective layers 15, 17 preferably have ZnS/SiO$_2$ or consist of this material.

The switching material 13 preferably has a phase change material or consists of a phase change material, particularly a chalcogenide compound, very especially preferably Ge$_3$Sb$_2$Te$_6$, which is also referred to as GST-326.

A thickness of the first arrangement layer 5—measured perpendicular to the imaginary plane—is preferably 60 nm, a thickness of each of the protective layers 15, 17 is preferably 10 nm, a thickness of the layer of switching material 13 is preferably 50 nm, and a thickness of the second arrangement layer 9 is preferably 100 nm.

In a preferred exemplary embodiment, a length of the nanostructures 7, 11 is preferably 660 nm, their width— measured on the imaginary plane—is preferably 40 nm, and their thickness—measured perpendicular to the imaginary plane—is preferably 50 nm. In this case, the geometry of the nanostructures 7, 11 is particularly adapted to a transparency window of the switching material 13, which has GST-326.

Through the selection of the specific geometry of the nanostructures 7, 11 and of the transparency window of the switching material 13, particularly through appropriate adaptation of these characteristics to one another, it is possible to modulate a chiral response of the device 1 and particularly a peak wavelength of a circular dichroism signal of the device 1 over a wide range of wavelengths. Peak wavelengths can be implemented in the gigahertz range, in the infrared range, in the visible spectral range, and/or in the ultraviolet range. In the previously described geometric embodiments and the selection of the switching material 13 as GST-326, the peak wavelength of the circular dichroism signal of the device 1 in the first and in the second switching state of the switching material 13 lies in the middle infrared range, particularly between 4 µm and 5 µm.

Both the first arrangement layer 5 and the second arrangement layer 9 preferably have a plurality, particularly a large number of nanostructures, each of which is aligned relative to one another in the manner of the dimer shown in FIG. 1. Each dimer preferably has the same chirality, thus resulting in a clear chirality for the device 1 as a whole.

It is possible for the plurality of nanostructures to be distributed periodically along the imaginary plane of the chiral arrangement 3. Alternatively, it is possible for them to be arrangement aperiodically, particularly in a position that is shifted slightly from their position provided according to a periodic arrangement, in order to efficiently suppress Rayleigh anomalies.

Especially preferably, the chiral arrangement 3 has a plurality of supercells, particularly a large number of supercells. A supercell, in turn, has a plurality of chiral dimers. The plurality of supercells is arranged periodically or aperiodically along the imaginary plane of the device 1.

Figure 2:
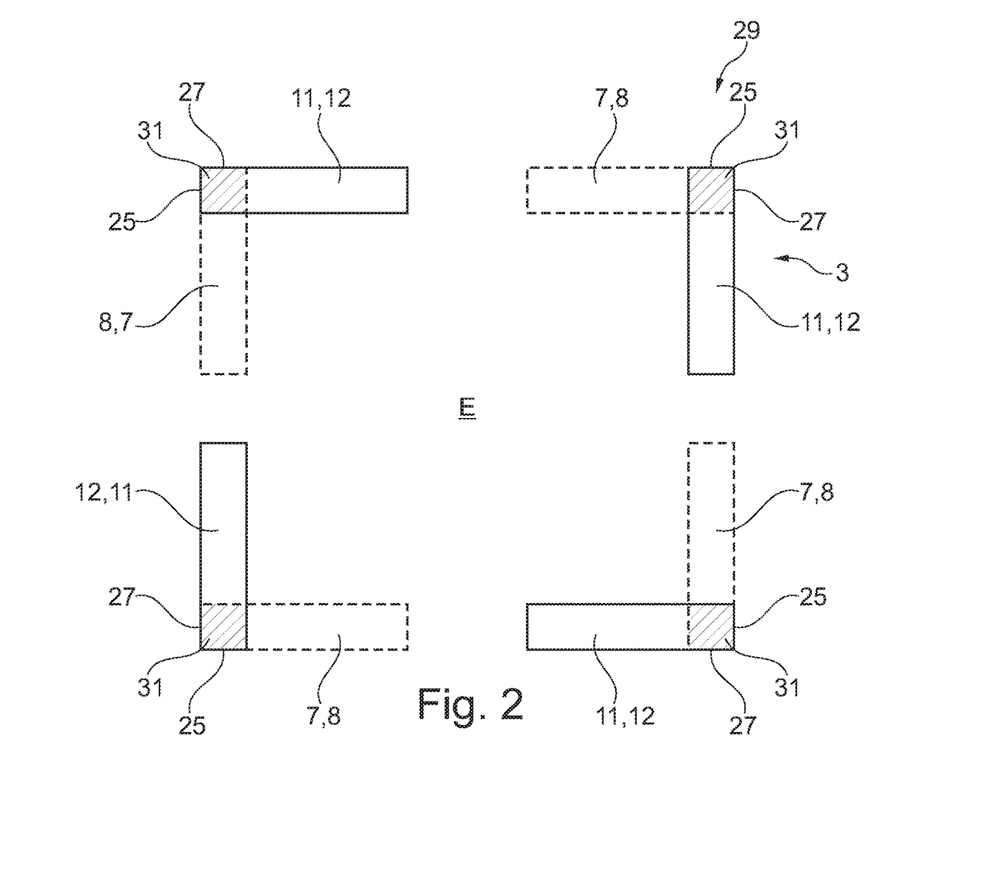
FIG. 2 shows a schematic detailed illustration of the first exemplary embodiment of the device.

FIG. 2 shows a schematic representation of an exemplary embodiment of such a supercell 29 having eight nanostructures, namely four first nanostructures 7 in the first arrangement layer 5 and four second nanostructures 11 aligned relative to the first nanostructures 7 in the second arrangement layer 9. Same and functionally analogous elements are provided with the same reference symbols, so reference is made in that regard to the preceding description. FIG. 2 shows a schematic top view of the imaginary plane E of the chiral arrangement 3, with the second nanostructures 11 being depicted with solid lines in order to indicate that they are arranged in a second arrangement layer 9 that is closer to the observer, and the first nanostructures 7 being depicted with dashed lines in order to indicate that they are arranged in the first arrangement layer 5 arranged under the second arrangement layer 9 and is therefore shifted farther from the observer into the image plane of FIG. 2. It is not shown that the switching material 13 is arranged between the first arrangement layer 5 and the second arrangement layer 9.

The supercell 29 thus has four respective nanostructures 7, 11 in each of the arrangement layers 5, 9 that are arranged along the edges of a rectangle, here of a square, the four nanostructures 7 of the first arrangement layer 5 being arranged in mirror symmetry to the four nanostructures 11 of the second arrangement layer 9. The mirror plane extends perpendicular to the arrangement layers 5, 9 and to the imaginary plane E of the chiral arrangement 3. It can also clearly be seen that a first nanostructure 7 and a second nanostructure 11 are respectively embodied as a nanorod, with a respective first nanorod 8 of the first arrangement layer 5 being oriented perpendicular to a second nanorod 12 of the second arrangement layer 9 when seen on the imaginary plane of the chiral arrangement, and with the nanorods 8, 12 being arranged so as to be vertically offset with respect to one another when seen in the viewing direction of the observer, the nanorods having overlapping ends 25, 27 when viewed from above onto the image plane of FIG. 2. An area of overlap 31 is depicted with crosshatching in each case.

From FIG. 2, it also becomes clear that each of the plasmonic dimers of the supercell 29 has the same chirality, so that the supercell 29 as a whole has a clear chirality. The first chiral arrangement 3 preferably has a plurality of periodically or aperiodically arranged supercells 29, all of which have an identical chirality, whereby the chiral arrangement 3 as a whole also has a clear chirality.

Figure 3:
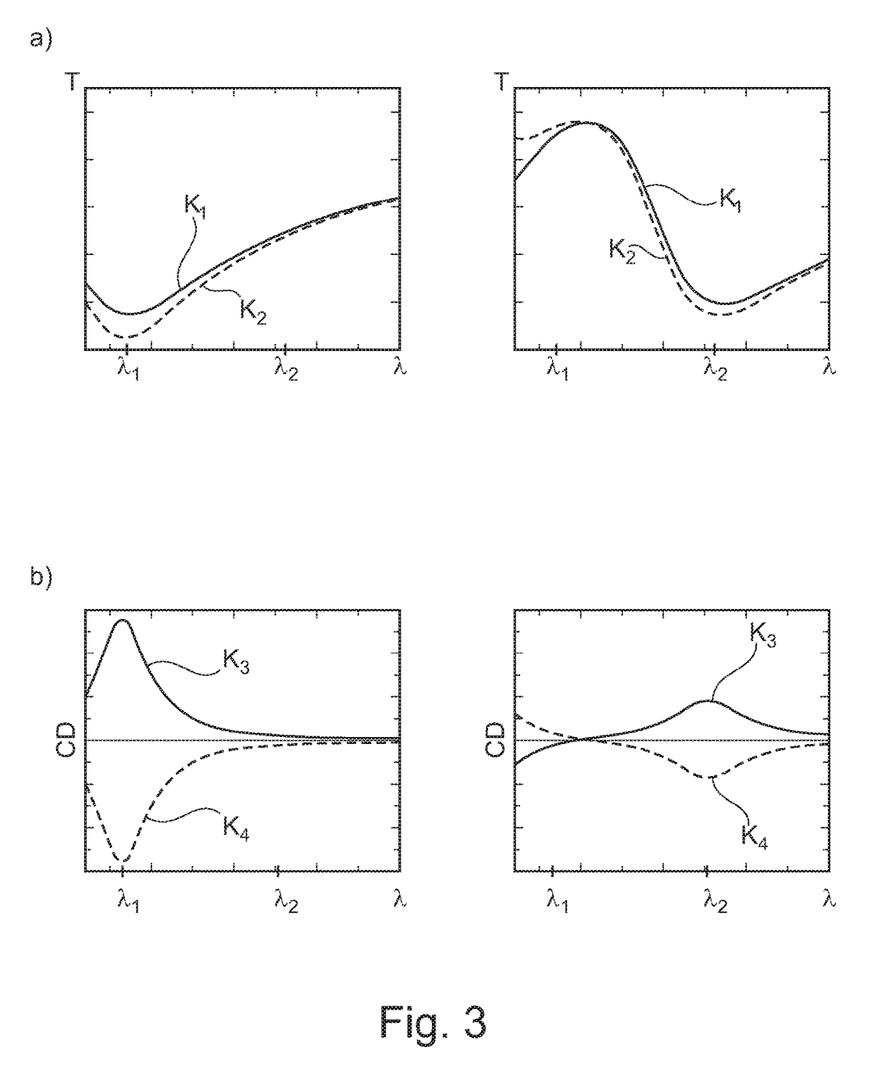
FIG. 3 shows a schematic, diagrammatic illustration of the functionality of the first exemplary embodiment of the device.

FIG. 3 shows a schematic, diagrammatic representation of the functionality of the exemplary embodiment of the device 1 according to FIGS. 1 and 2.

FIG. 3a) shows, in two diagrams, a respective transmission T of the device 1 plotted against a wavelength λ. The left diagram shows the behavior of the device 1 in a first switching state of the switching material 13, and the right diagram shows the behavior of the device 1 in the second switching state of the switching material 13. The first curve K1, which is shown as a solid line, respectively shows the transmission of right-handedly, circularly polarized light through the device 1, and a second curve K2, which is shown as a dashed line, respectively shows the transmission of left-handedly, circularly polarized light through the device 1.

It is observed that, in a first switching state of the switching material 13 for a first peak wavelength $\lambda_1$, both the transmission for right-handedly and left-handedly, circularly polarized light are at the lowest, i.e., the absorption is at the greatest, and the difference in the transmission between right-handedly, circularly polarized light on the one hand and left-handedly, circularly polarized light on the other hand is greatest. The first peak wavelength $\lambda_1$ is thus a peak wavelength of the chiral optical response of the device 1.

By switching the switching material 13 into the second switching state, for example through phase transformation of a switching material 13 embodied as a phase change material from an amorphous to a crystalline state, the dielectric environment for the nanostructures 7, 11 changes, so that the peak wavelength of the chiral optical response of the device 1 shifts from the first wavelength $\lambda_1$ to a second wavelength $\lambda_2$, which is shown in the right diagram of FIG. 3a). In this second switching state, the device 1 has no noteworthy absorption at the first wavelength $\lambda_1$ and only dwindling circular dichroism. By switching the switching material 13 from the first to the second switching state—and back—it is thus possible to switch the chiral optical response of the device 1 at the first wavelength $\lambda_1$ on and off. The switching can preferably be induced thermally, optically and/or electrically. Particularly in the case of electrical and/or optical switching, very short switching times of a few femtoseconds or of a few picoseconds are possible.

FIG. 3b) shows circular dichroism signals CD of the device 1, plotted against the wavelength $\lambda$. The circular dichroism signals CD are calculated from the transmission spectra shown in FIG. 3a), preferably using equation (1) shown above.

A third, solid curve K3 respectively represents the circular dichroism signal for a right-handed chiral arrangement 3, and a fourth, dashed curve K4 represents the circular dichroism signal for a left-handed chiral arrangement 3. The right-handed chiral arrangement and the left-handed chiral arrangement are enantiomers in relation to one another. In particular, the chiral dimers, especially preferably the supercells 29 of the left-handed chiral arrangement, preferably have the mirror-inverted configuration to the chiral dimers, particularly to the supercells 29 of the right-handed chiral arrangement.

It is observed that, in the first switching state, which corresponds to the left diagram, the circular dichroism signal CD of the device 1 is at the maximum at the first wavelength $\lambda_1$, whereas it more or less disappears at the first wavelength $\lambda_1$ upon switching into the second switching state, which is associated with the right diagram, but is at the maximum at the second wavelength $\lambda_2$, but with a smaller amplitude. It can thus also be seen from FIG. 3b) that the chiral optical response of the device 1 can be switched on and off at the first wavelength $\lambda_1$ by switching the switching material 13 from the first switching state to the second switching state and back again.

The spectral positions of the two wavelengths $\lambda_1$ and $\lambda_2$ differ sufficiently from one another, so that a spur of the signal at the second wavelength $\lambda_2$ in the second switching state, for instance, will not have a disruptive effect at the spectral position of the first wavelength $\lambda_1$. In particular, a red shift of the circular dichroism signal by approximately 20% preferably occurs upon switching the switching material 13 from the first switching state to the second switching state.

Figure 4:
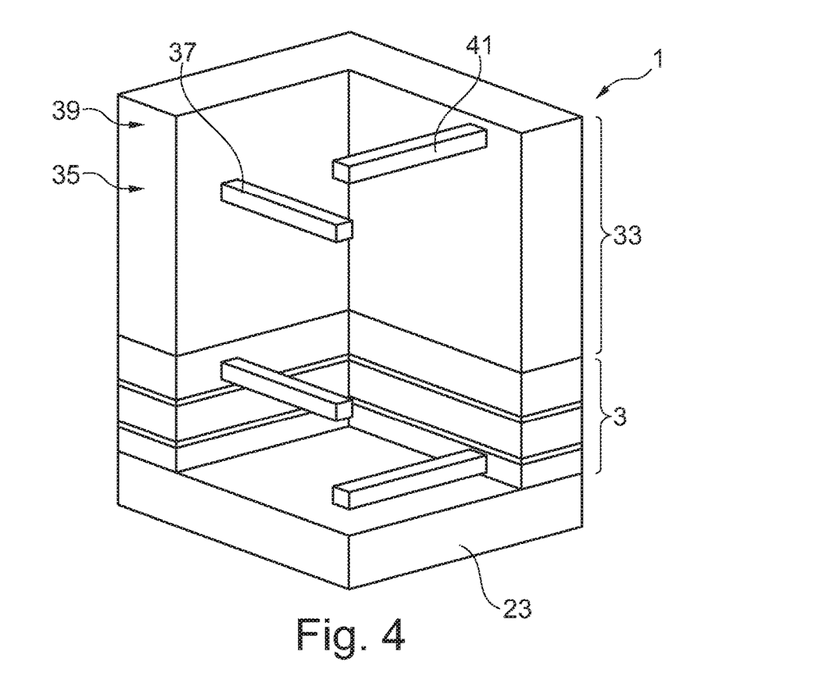
FIG. 4 shows a schematic illustration of a second exemplary embodiment of the device.

FIG. 4 shows a schematic representation—analogous to the illustration according to FIG. 1—of a second exemplary embodiment of the device 1. Same and functionally analogous elements are provided with the same reference symbols, so reference is made in that regard to the preceding description. A second chiral arrangement 33 is arranged here on the first chiral arrangement 3. It is free of switching material, that is, it has no switching material. In this regard, the first chiral arrangement 3 is preferably embodied as an active chiral arrangement, the second chiral arrangement 33 preferably being embodied as a passive chiral arrangement. A vertical distance between the first chiral arrangement 3 and the second chiral arrangement 33 is preferably selected such that no near-field coupling takes place between the two chiral arrangements 3, 33. In particular, the distance between the first chiral arrangement 3 and the second chiral arrangement 33 is preferably at least 200 nm.

The second chiral arrangement has a first arrangement layer 35 with a first nanostructure 37 and a second arrangement layer 39 arranged on same with a second nanostructure 41. The nanostructures 37, 41 are each embedded in covering layers, but the first arrangement layer 35 and the second arrangement layer 39—unlike in the first chiral arrangement—are arranged over one another so as to be directly and immediately adjacent, with no protective layers 15, 17 and switching material 13 arranged therebetween. In addition, the second chiral arrangement 33 is preferably embodied the same as the first chiral arrangement 3, particularly having chiral optical characteristics, particularly a circular dichroism signal, at a same peak wavelength $\lambda_1$ as the first chiral arrangement 3 in the first switching state of the switching material 13, albeit with inverted chirality in comparison to the first chiral arrangement 3, with the circular dichroism signal of the second chiral arrangement 33 having an inverted sign and a half amplitude in comparison to the circular dichroism signal of the first chiral arrangement 3.

The inverted chirality of the second chiral arrangement 33 relative to the first chiral arrangement 3 is achieved particularly through mirroring of the chiral dimers, particularly through mirroring of the chiral arrangement 33 relative to the first chiral arrangement 3. The tuning of the chiral response to the same wavelength but with a different dielectric environment due to the lack of switching material 13 is preferably achieved by adapting the geometry, particularly the length, of the nanostructures 37, 41. It is preferably achieved through appropriate geometric adaptation of a vertical distance between the nanostructures 37, 41 that the circular dichroism signal of the second chiral arrangement 33 has a half amplitude in comparison to the circular dichroism signal of the first chiral arrangement 3. The inverted sign of the circular dichroism signal results from the reversed chirality of the second chiral arrangement 33 relative to the first chiral arrangement 3.

If the first chiral arrangement 3 is right-handed, for example, the second chiral arrangement 33 is left-handed, and vice versa.

Figure 5:
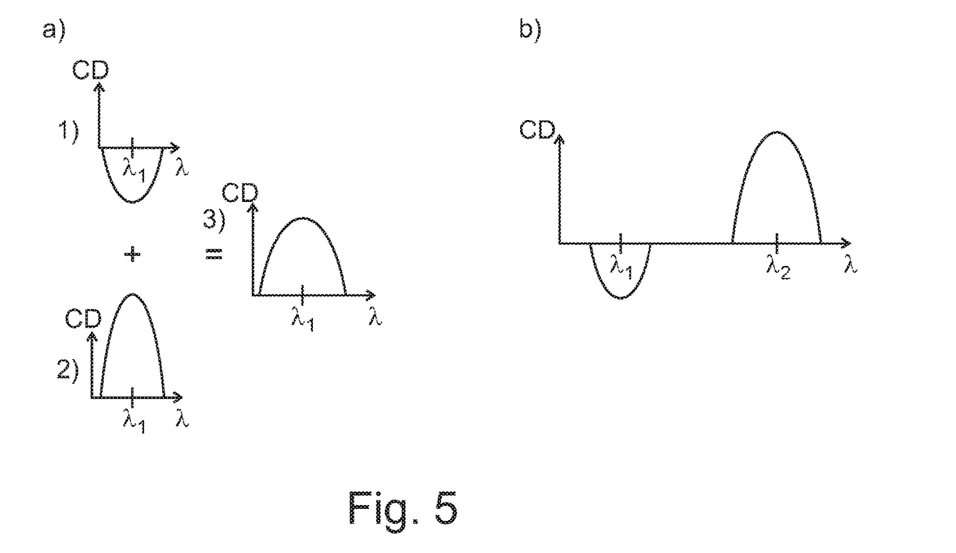
FIG. 5 shows a schematic, diagrammatic illustration of the functionality of the second exemplary embodiment.

FIG. 5 serves to explain the functionality of the device 1 according to FIG. 4 in greater detail:

FIG. 5a) shows a first, schematic and diagrammatic illustration in which, in a first diagram 1), the circular dichroism signal CD of the second chiral arrangement 33 is plotted against the wavelength $\lambda$, and, in a second diagram 2), the circular dichroism signal CD of the first chiral arrangement 3 is plotted against the wavelength $\lambda$. In the first switching state of the switching material 13, both circular dichroism signals CD lie at the first peak wavelength $\lambda_1$ with the circular dichroism signal CD of the second chiral arrangement 33 having a reversed sign with half amplitude in comparison to the circular dichroism signal CD of the first chiral arrangement 3. In a third diagram 3), the circular dichroism signal CD of the device 1 as a whole is shown plotted against the wavelength $\lambda$, with this signal being derived as the sum of the two circular dichroism signals CD of the chiral arrangements 3, 33. This circular dichroism signal CD of the device 1 as a whole therefore has a half amplitude with the same sign compared to the circular dichroism signal CD of the first chiral arrangement 3.

FIG. 5b) shows the circular dichroism signal CD of the device 1 according to FIG. 4 in the second switching state of the switching material 13. It can be seen here that, as a result of the switching of the switching material 13, the circular dichroism signal of the first chiral arrangement 3—as explained previously in connection with FIG. 3—is shifted to the second peak wavelength $\lambda_2$. As a result, the first chiral arrangement 3 no longer has any chiral response at the first wavelength whereby the chiral optical response of the second chiral arrangement 33 is exposed, as it were. This results in a circular dichroism signal for the entire device 1 in the second switching state at the first peak wavelength $\lambda_1$ that corresponds exactly to the circular dichroism signal of the second chiral arrangement, i.e., that has a half amplitude with reversed sign in comparison to the circular dichroism signal of the first chiral arrangement 3.

If one compares the third diagram 3) of FIG. 5*a*) to the diagram of FIG. 5*b*), then one sees that, in the second switching state, the device 1 as a whole has an inverted circular dichroism signal at the first wavelength $\lambda_1$ with reversed sign but equal amplitude. The circular dichroism signal of the device 1 can thus be inverted at constant amplitude at the first wavelength $\lambda_1$ by switching the switching material 13 from the first switching state to the second switching state—and back again. The chiral effect of the device 1 therefore cannot be simply switched on and off at the first wavelength $\lambda_1$ like in the first exemplary embodiment; rather, it is even possible in the second exemplary embodiment to switch between a left-handed and a right-handed effect of the device 1 at the first peak wavelength $\lambda_1$.

This enables active control of the chirality of the chiral metamaterial made available by the device 1, and this with very rapid switching times of a few femtoseconds (optical) and a few picoseconds (electrical) to boot. Moreover, it can be seen that the device 1 can be modulated over wide wavelength ranges. What is more, it is very robust and very compact as a layer system, not requiring any freestanding or moving parts of any kind for their function.

The invention claimed is:

1. A device with switchable, chiral optical characteristics, the device comprising:
   a first chiral arrangement having a first arrangement layer with at least one first nanostructure and a second arrangement layer with at least one second nanostructure, the first nanostructure and the second nanostructure arranged relative to one another such that the chiral arrangement is chiral; a switching material with switchable dielectric characteristics arranged between the first arrangement layer and the second arrangement layer;
   a second chiral arrangement arranged on the first chiral arrangement, the second chiral arrangement having a third arrangement layer with at least one third nanostructure and a fourth arrangement layer with at least one fourth nanostructure,
   wherein the second chiral arrangement is free of a switching material, and
   wherein the second chiral arrangement has chiral optical characteristics at a same wavelength as the first chiral arrangement.

2. The device of claim 1, wherein the switching material is switchable between a first switching state in which a dielectric constant of the switching material has a first value and a second switching state in which the dielectric constant of the switching material has a second value that is different from the first value.

3. The device of claim 2, wherein the switching material is reversibly switchable.

4. The device of claim 2, wherein a transition between the first switching state and the second switching state is induced thermally, optically and/or electrically.

5. The device of claim 2, wherein the switching material is embodied as a phase change material, the first switching state being associated with a first phase and the second switching state being associated with a second phase of the phase change material.

6. The device of claim 1, further comprising a protective layer arranged between the first arrangement layer and the switching material and/or between the switching material and the second arrangement layer.

7. The device of claim 1, wherein the first and the second arrangement layer have a plurality of periodically or aperiodically arranged nanostructures.

8. The device of claim 1, wherein at least one nanostructure of the first arrangement layer and/or of the second arrangement layer is embedded in a covering layer.

9. The device of claim 8, wherein the at least one first nanostructure is a first nanorod and the at least one second nanostructure is a second nanorod, wherein the first nanorod of the first arrangement layer is oriented perpendicular to the second nanorod of the second arrangement layer when seen on an imaginary plane of the chiral arrangement, and wherein the first and second nanorods are arranged so as to be vertically offset with respect to one another and have overlapping ends when viewed from above.

10. The device of claim 1, wherein the chiral arrangement has a supercell of eight nanorods, wherein the supercell has four nanorods in each arrangement layer that are arranged along the edges of a rectangle, the four nanorods of the first arrangement layer being arranged in mirror symmetry to the four nanorods of the second arrangement layer, with the mirror plane extending perpendicular to the arrangement layers.

11. The device of claim 1, wherein the second chiral arrangement:
   has a reversed chirality in comparison to the first chiral arrangement, and
   has a circular dichroism signal with inverted sign and half amplitude in comparison to the first chiral arrangement.

12. The device of claim 1, wherein the first chiral arrangement is built on a substrate, the substrate being transparent in at least one predetermined wavelength range.

13. The device of claim 1, wherein the first chiral arrangement has a circular dichroism signal at a wavelength in the gigahertz range, in the terahertz range, in the infrared range, in the visible range, and/or in the ultraviolet range.

14. The device of claim 1, wherein the first chiral arrangement has a circular dichroism signal in the middle infrared range, particularly in a wavelength range from at least 4 μm to no more than 5 μm.

15. The device of claim 14, wherein the middle infrared range is from at least 4.15 μm to no more than 4.9 μm.

16. The device of claim 1, in combination with a polarization modulation apparatus.

17. An instrument for thermal imaging, for polarization-sensitive detection, and/or for stereo imaging, the instrument comprising the device according to claim 1.

18. A method of thermal imaging, for polarization-sensitive detection, and/or for stereo imaging, the method comprising:
   performing thermal imaging, polarization-sensitive detecting, and/or stereo imaging with an instrument comprising the device of claim 1.

19. A device with switchable, chiral optical characteristics, the device comprising:
   a first chiral arrangement having a first arrangement layer with at least one first nanostructure and a second arrangement layer with at least one second nanostructure, the first nanostructure and the second nanostructure arranged relative to one another such that the chiral arrangement is chiral;
   a switching material with switchable dielectric characteristics arranged between the first arrangement layer and the second arrangement layer; and a second chiral arrangement arranged on the first chiral arrangement, the second chiral arrangement having a third arrangement layer with at least one third nanostructure and a fourth arrangement layer with at least one fourth nanostructure, wherein the second chiral arrangement is free of a switching material, and wherein the second chiral arrangement has chiral optical characteristics at a same wavelength as the first chiral arrangement, wherein the at least one first nanostructure comprises a first nanorod and the at least one second nanostructure comprises a second nanorod, wherein the first nanorod of the first arrangement layer is oriented at an angle to the second nanorod of the second arrangement layer when seen on an imaginary plane of the chiral arrangement, and wherein the first and second nanorods are arranged so as to be vertically offset with respect to one another and have overlapping ends when viewed from above.

20. A device with switchable, chiral optical characteristics, the device comprising:

a first chiral arrangement having a first arrangement layer with at least one first nanostructure and a second arrangement layer with at least one second nanostructure, the first nanostructure and the second nanostructure arranged relative to one another such that the chiral arrangement is chiral; and a switching material with switchable dielectric characteristics arranged between the first arrangement layer and the second arrangement layer, and a second chiral arrangement arranged on the first chiral arrangement, the second chiral arrangement having a third arrangement layer with at least one third nanostructure and a fourth arrangement layer with at least one fourth nanostructure, wherein the second chiral arrangement is free of a switching material, wherein the second chiral arrangement has chiral optical characteristics at a same wavelength as the first chiral arrangement, wherein the second chiral arrangement has a reversed chirality in comparison to the first chiral arrangement, and wherein the second chiral arrangement has a circular dichroism signal with inverted sign and half amplitude in comparison to the first chiral arrangement.

* * * * *